ARNOLD ISCHE AND ALBERT ISCHE.
NEST BOX FOR HENS.
APPLICATION FILED DEC. 1, 1919.
1,379,628.
Patented May 31, 1921.
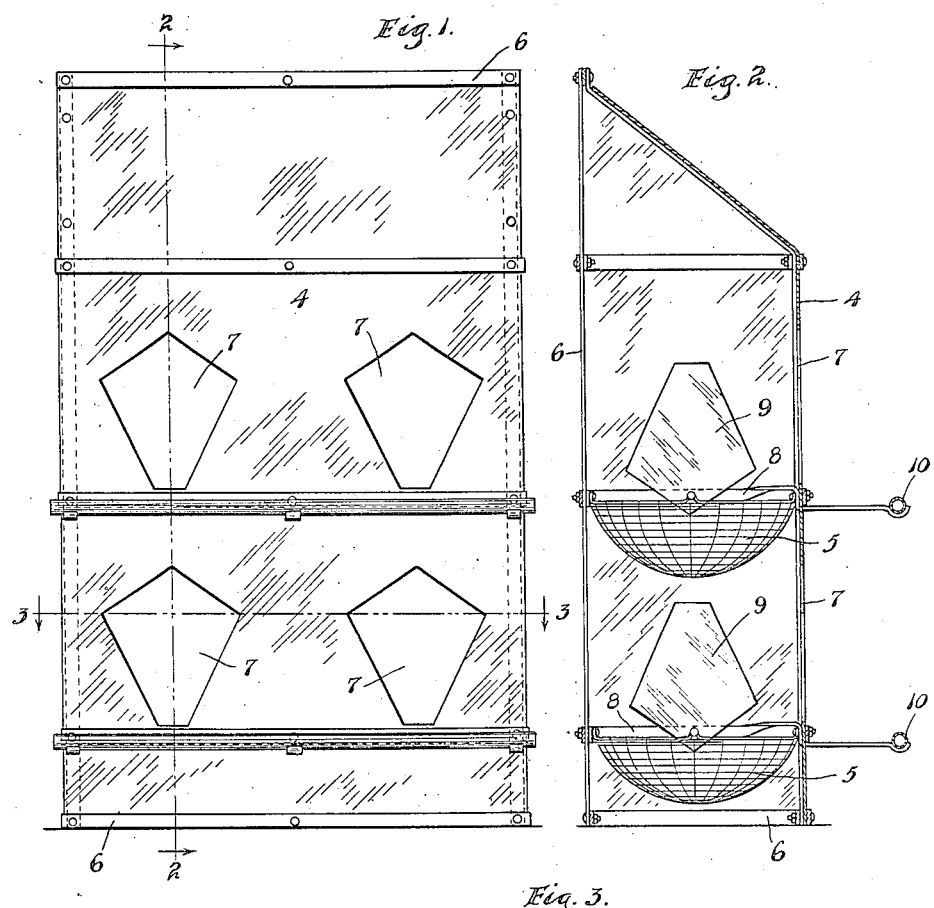
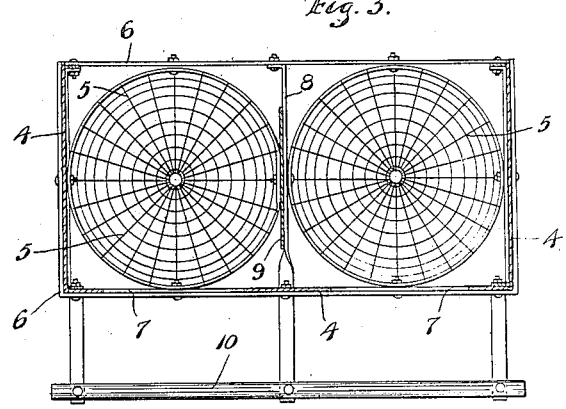
INVENTORS
ARNOLD ISCHE
ALBERT ISCHE
BY THEIR ATTORNEYS

UNITED STATES PATENT OFFICE.

ARNOLD ISCHE, OF NORWOOD, AND ALBERT ISCHE, OF HAMBURG, MINNESOTA.

NEST-BOX FOR HENS.

1,379,628.   Specification of Letters Patent.   Patented May 31, 1921.

Application filed December 1, 1919. Serial No. 341,724.

*To all whom it may concern:*

Be it known that we, ARNOLD ISCHE and ALBERT ISCHE, who are citizens of the United Sates, residing at Norwood and Hamburg, respectively, in the county of Carver and State of Minnesota, have invented certain new and useful Improvements in Nest-Boxes for Hens; and we do hereby declare the following to be a full, clear, and exact description of the invention, such as will enable others skilled in the art to which it appertains to make and use the same.

Our invention has for its object to provide an extremely simple, highly efficient and sanitary nest box for hens, and, to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a front elevation of the invention;

Fig. 2 is a vertical section taken on the line 2—2 of Fig. 1; and

Fig. 3 is a horizontal section taken on the line 3—3 of Fig. 1.

The nest box 4 is preferably made from sheet metal and has a top, which slopes upward from the front to the back thereof, and also an open back. Said nest box 4 will, of course, be placed against a wall or partition to close the open back thereof. Within the nest box 4 are four nests 5 arranged in laterally spaced pairs located the one above the other. It is, of course, understood that the nest box may be made to hold various different number of nests. Vertical and horizontal bars 6 are bolted to afford a skeleton frame and give the nest box 4 the required rigidity.

In front of each nest 5 is cut in the front wall of the nest box 4, a door opening 7 having a short sill or bottom portion, upwardly diverging sides and a top that is in the form of an inverted flat V. The nests 5 are, as shown, of wire formation and secured by bolts to the front and side walls of the nest box 4, to certain of the horizontal back bars 6 and intermediate tie-bars 8. The panels cut from the front of the nest box 4, in forming the openings 7, are inverted and secured at their points to the intermediate tie-bars 8 to afford partitions 9 between the respective pairs of nests 5. The upwardly converging edges of the partitions 9 are spaced apart from the front and back of the nest box but not sufficiently to permit a chicken to roost on the tie-bars 8. Secured to the nest box 4, in front of and slightly below each horizontally spaced pair of door openings 7 is a perch 10.

The purpose of forming the door openings 7 with short sills and upwardly diverging sides is to prevent chickens from roosting on said sills or on the adjacent portions of the nest 5, but said openings are of sufficent size to permit a chicken to pass freely therethrough and step on the bottoms thereof. The sides of the openings 7 are so close together that if a hen attempts to roost on the bottom of the opening said sides will contact with her body, so that she will find it impossible to assume a roosting position. The same results will follow if the hen attempts to roost on bar 8 at the sides of the baffle 9. With the peculiarly shaped openings 7 and partitions 9, together with the walls and back of the nest box 4, it is impossible for a chicken to roost on the edges of the nests 5 or any part of the nest box. The sloping top of the nest box prevents chickens from standing thereon or the accumulation of dirt. By forming the partitions 9 from the panels cut from the front of the nest box 4 when forming the openings 7, there is no waste material in the manufacture of the improved nest box.

The above described nest box, while extremely simple and comparatively cheap to manufacture, is sanitary and easy to keep clean.

What we claim is:—

1. A nest box for hens having two laterally spaced nests, a nest-supporting bar extending between said two nests, a door opening in the box in front of each nest, said door openings having upwardly diverging sides, and a transverse partition secured to the supporting bar and having upwardly converging edges spaced apart from the front and rear walls of said box.

2. A nest box for hens having a door opening having a straight short horizontal sill portion and straight upwardly diverging side portions, the distance between the diverging side portions being such that the same will contact the body of the hen attempting to roost on said sill portion.

3. A nest box comprising closed front and side portions, a nest supported therein and extending closely adjacent to the front portion, said front portion having an entrance opening therein comprising a short straight horizontal sill portion, and upwardly diverging side portions, the distance between the side portions being such that the same will contact the sides of the body of the hen attempting to roost on the sill portion.

4. A nest box for hens comprising a closed casing, a bar extending across the same substantially at the central portion thereof, nests supported on each side of said bar and extending adjacent to the front of the casing, said front portion in the casing having a section cut therefrom to form an entrance opening having a short horizontal straight sill portion and substantially straight side portions diverging upwardly therefrom and converging top portions extending from the upper ends of the side portion, the distance between the side portions being such that the same will contact with the body of a hen attempting to roost on the sill portion, and a baffle between the nests secured to the central portion of the said bar, said baffle being of the same shape as the door opening but disposed in inverted position whereby the sides of the same extend downwardly toward the sides of the casing in such position that the same will contact with the body of the hen attempting to roost on said bar.

5. A method of constructing a nest box which consists in providing a rectangular casing, placing a bar thereacross substantially at the longitudinal central portion thereof, supporting nest structures in said casing at each side of said bar, cutting from the front of said casing in front of each nest a section leaving an opening having a horizontal sill portion, upwardly diverging side portion, and converging top portions, said portions being substantially straight, and securing said sections cut from said openings in inverted relation to the central portion of said bar to constitute a baffle.

In testimony whereof we affix our signatures in presence of two witnesses.

ARNOLD ISCHE.
ALBERT ISCHE.

Witnesses:
H. F. DROEGE,
WM. J. BELTER.